United States Patent [19]

Richter et al.

[11] Patent Number: 4,926,280

[45] Date of Patent: May 15, 1990

[54] CAPACITOR PROTECTION CIRCUIT FOR PROTECTING STORAGE CAPACITORS IN AN ELECTRONIC POWER SUPPLY

[75] Inventors: Jeff T. Richter, Apopka; Elbert E. Seignemartin, Altamonte Springs, both of Fla.

[73] Assignee: NCR Corporation, Dayton, Ohio

[21] Appl. No.: 432,453

[22] Filed: Nov. 6, 1989

[51] Int. Cl.⁵ .............................................. H02H 3/24
[52] U.S. Cl. ...................................... 361/15; 361/16; 361/91; 361/104
[58] Field of Search ...................... 361/15, 17, 86, 91, 361/272, 16, 104; 320/1; 324/548

[56] References Cited

U.S. PATENT DOCUMENTS

| | | | |
|---|---|---|---|
| 3,414,797 | 12/1968 | Morgan . | |
| 3,617,864 | 11/1971 | Senger | 307/252 |
| 3,748,534 | 7/1973 | Jones | 320/1 |
| 3,801,870 | 4/1974 | Grove, Jr. et al. | 361/16 |
| 3,878,434 | 4/1975 | Voorhoeve | 361/91 X |
| 4,012,667 | 3/1977 | Ishida et al. | 361/16 |
| 4,315,304 | 2/1982 | Marez et al. | 363/49 |
| 4,646,220 | 2/1987 | Dao | 363/28 |

Primary Examiner—Derek S. Jennings
Attorney, Agent, or Firm—Wilbert Hawk, Jr; Albert L. Sessler, Jr.; Elmer Wargo

[57] ABSTRACT

A capacitor protection circuit for protecting bulk storage capacitors in a storage capacitor circuit in an electronic power supply. The capacitor protection circuit is operatively coupled to the storage capacitor circuit and comprises a first and second thyristor. The first and second thyristors are selected so that when the voltage across one of the storage capacitors in the storage capacitor circuit exceeds a predetermined voltage, the second thyristor will trigger the first thyristor to cause an excessive amount of current to be drawn through a fuse in the electronic power supply, thereby causing the fuse to blow and uncoupling the electronic circuit from an AC input. Another embodiment is disclosed to show how the capacitor protection circuit can be used in a 110 or 220 volt environment by utilizing a switch.

21 Claims, 4 Drawing Sheets

CAPACITOR PROTECTION CIRCUIT FOR PROTECTING STORAGE CAPACITORS IN AN ELECTRONIC POWER SUPPLY

BACKGROUND OF THE INVENTION

1. Field of the Invention. This invention relates to an electronic power supply and more particularly to a capacitor protection circuit for protecting storage capacitors in the electronic power supply.

2. Description of Related Art. In a typical conventional power supply, an incoming AC voltage is rectified, filtered, and supplied to an inverter circuit. The rectified voltage is typically stored in high energy bulk capacitors before the voltage is supplied to the inverter circuit. The inverter circuit switches the filtered voltage on and off at a high rate to generate a high frequency square wave of a desired voltage level. An output transformer and rectifier circuit then converts the square wave to a desired pulsing DC voltage and passes the pulsing DC voltage through a network of filters and a rectifier to produce a DC voltage output. The DC voltage output of the power supply is regulated by varying the pulse width of the DC voltage generated by the inverter circuit.

An excessive voltage across the bulk capacitors can overstress the bulk capacitors and can cause damage to the power supply by, for example, causing the bulk capacitors to vent or leak electrolyte fluid. The electrolyte fluid may cause a short circuit in the power supply which can cause the power supply to malfunction. The overstressed bulk capacitors may also present a safety or fire hazard. There is, therefore, a need to protect the bulk capacitors from an excessive AC voltage input.

SUMMARY OF THE INVENTION

An object of this invention is to protect the capacitors and other components in the power supply from damage due to a surge in the associated AC power source.

Another object of this invention is to provide a circuit that makes it easy to restore normal operation after the power supply has been shut down.

Another object of this invention is to provide a capacitor protection circuit which can be easily included as part of the power supply.

In one aspect, this invention includes: a capacitor protector circuit for protecting a capacitor in an electronic circuit, the electronic circuit comprising: a fuse having a first end connected to an AC input; and at least one diode connecting a second end of the fuse to a first end of the capacitor with a second end of the capacitor being connected to ground; the capacitor protector circuit comprising: a voltage divider connected across the capacitor; first thyristor means also connected across the capacitor; and second thyristor means coupling the voltage divider and the first thyristor means; the second thyristor means triggering the first thyristor means to conduct, causing an excessive amount of current to flow through the fuse to uncouple the electronic circuit from the AC input when the voltage across the capacitor exceeds a predetermined voltage.

In another aspect, this invention includes: a circuit comprising: a fuse having first and second ends, with the first end connected to an AC input; a first capacitor having first and second ends, the first capacitor also having a maximum voltage rating, the second end of the first capacitor being connected to ground; at least one diode connecting the second end of the fuse to the first end of the capacitor; rectifier means connecting the second end of the fuse to the first end of the first capacitor for rectifying the AC voltage; a voltage divider means connected across the first capacitor; first thyristor means connected in parallel across the first capacitor; and second thyristor means operatively coupling the voltage divider means and the first thyristor means; the second thyristor means triggering the first thyristor means to conduct, causing an excessive amount of current to flow through the fuse to uncouple the circuit from the AC input when the voltage across the first capacitor exceeds a predetermined voltage which is less than the maximum voltage.

In yet another aspect, this invention includes: a circuit comprising: a fuse having first and second ends, the first end being connected to an AC input; a first capacitor having first and second ends, the first capacitor having a maximum voltage rating; a first diode connecting the second end of the fuse to the first end of the first capacitor, the second end of the first capacitor being connected to ground; at least one first resistor and at least one second resistor, the first and second resistors being connected in series across the first capacitor for providing a voltage divider; a second capacitor having first and second ends, the second capacitor being connected in parallel across the second resistor; a third resistor having first and second ends, the first end being connected to ground; a first thyristor having an anode, a cathode, and a trigger; a thermistor connected between the first end of the first capacitor and the anode of the first thyristor; and a second thyristor having an anode and a cathode, the anode of the second thyristor being connected to the first end of the second capacitor, the cathode of the second thyristor being connected to the second end of the third resistor; the first thyristor having its cathode connected to ground and its trigger connected to the cathode of the first thyristor; the second thyristor triggering the first thyristor and causing an excessive amount of current to flow through the fuse when the voltage across the first capacitor exceeds a predetermined voltage which is less than the maximum voltage.

An advantage of this invention is that it is easy and inexpensive to manufacture.

Another advantage of this invention is that the circuit also discharges the bulk capacitors to a safe level when the power supply is turned off.

These advantages, and others, may be more readily understood in connection with the following specification, claims, and drawing.

DESCRIPTION OF THE PREFERRED EMBODIMENT

Figure 1:
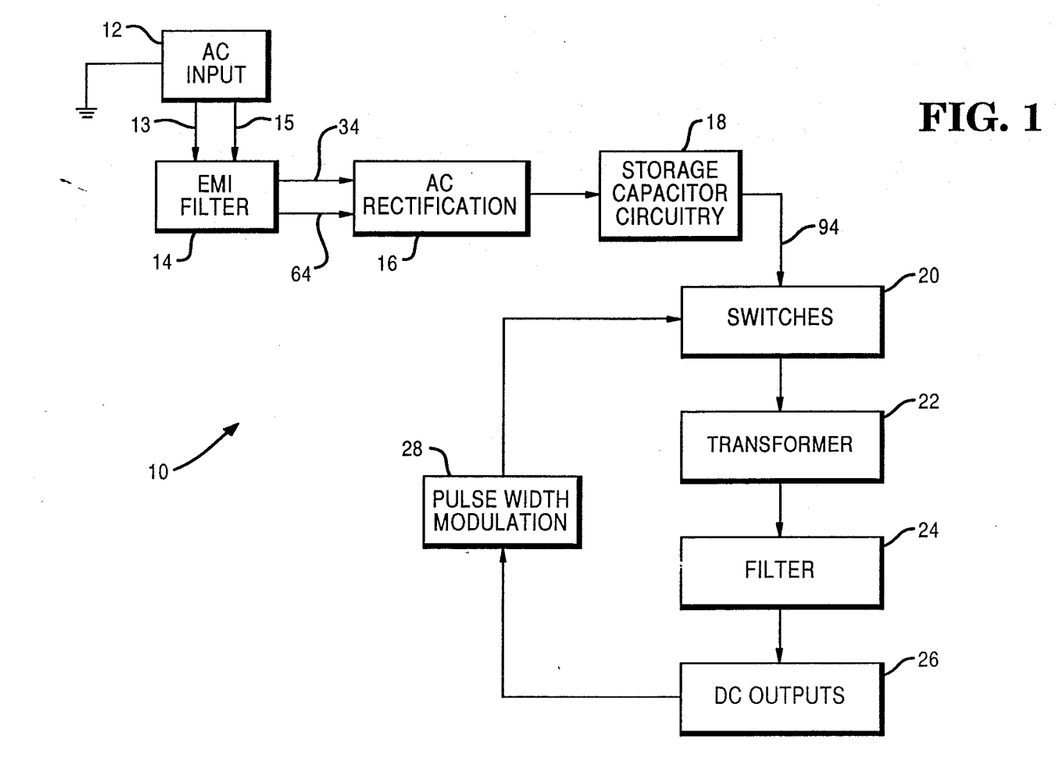
FIG. 1 a general schematic diagram of a power supply system in which a preferred embodiment of this invention may be used.

FIG. 1 is a general schematic diagram of a power supply, hereinafter generally designated as 10. The function of the power supply 10 is to transform an AC input voltage to a DC output voltage. The general operation of the power supply 10 is as follows. The power supply 10 includes an AC input 12 which is conventionally coupled to ground. The AC input 12 includes "hot" and neutral sides which are fed on lines 13 and 15, respectively, to an electromagnetic interference (EMI) filter 14. The EMI filter 14 smoothes out the AC signal and substantially reduces the electromagnetic interference, and then the EMI filter 14 transmits the AC signal line and neutral to an AC rectifier 16 which rectifies the AC signal. The resulting DC signal is then received by a storage capacitor circuit 18 which stores the DC voltage. The DC voltage which may be high is then transmitted from the storage capacitor circuit 18 to switches 20 which convert the high DC voltage to a high pulsed DC voltage. The switches 20 are coupled to a transformer 22 which transforms the high pulsed DC voltage to a low pulsed DC voltage which is fed to a filter 24 which filters the low pulsed DC voltage to a constant DC voltage output. It should be noted that filter 24 further includes a rectifier (not shown) which enables the filter 24 to rectify the low pulsed DC voltage to a constant DC voltage output. The constant DC voltage is outputted from the filter 24 to output terminals 26. A pulse width modulator 28 is connected between the DC outputs 26 and switches 20. The pulse width modulator 28 controls the switches 20 which in turn control the level of the constant DC voltage output. The pulse width modulator 28 can, for example, increase the constant DC voltage output by causing switches 20 to be on for a longer period of time.

The present invention, hereinafter designated generally as capacitor protection circuit 30 (FIG. 2), resides in the storage capacitor circuit 18 portion of power supply 10. The functions of the capacitor protection circuit 30 are to protect a first and second storage capacitor 38 and 40 in the storage capacitor circuit 18 and also to protect the other components of power supply 10 by causing a fuse 32 to blow when an excessive amount of voltage is applied across the first and second storage capacitors 38 and 40, as will be described later herein.

Figure 2:
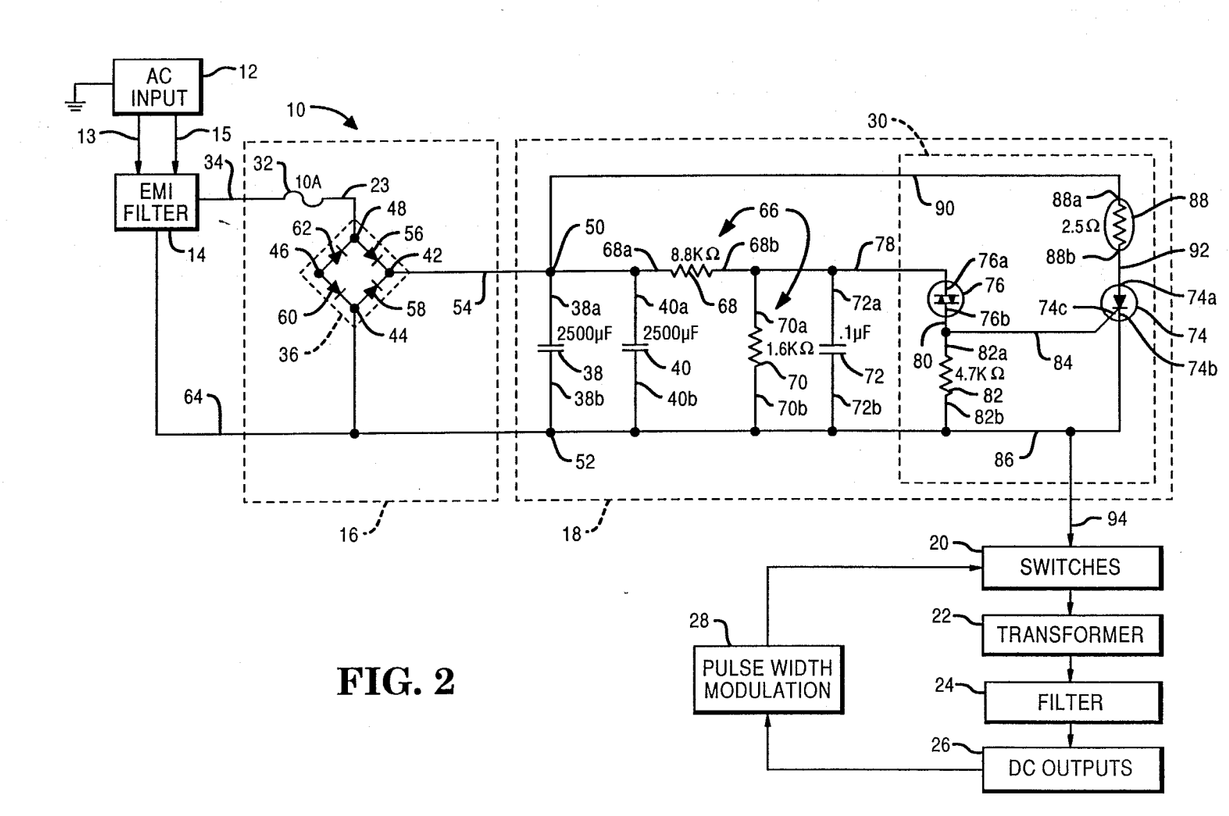
FIG. 2 is a schematic diagram of a power supply, showing details of a preferred embodiment of this invention.

Notice that the power supply 10 (FIG. 2) includes the rectifier 16. The rectifier 16 includes the fuse 32 which has a first end coupled to the EMI filter 14 by line 34. A typical fuse 32 in the embodiment described has a fuse rating of 10 amperes. The rectifier bridge 36 has opposed first and second terminals 42 and 46, respectively, and also has opposed third and fourth terminals 44 and 48, respectively. Suitable diodes 56, 58, 60, and 62 are positioned between the terminals 42, 44, 46, and 48, as shown in FIG. 2 to form the rectifier bridge 36. As mentioned previously herein, the function of the rectifier bridge 36 is to receive the AC signal via the EMI filter 14 and fuse 32 on line 23 and to rectify the AC signal for storage in the first and second storage capacitors 38 and 40. In a preferred embodiment, the storage capacitor circuit 18 includes first and second connection nodes 50 and 52, respectively. The second connection node 52 is connected by line 64 to AC neutral which has been filtered through filter 14 and to the third terminal 44 of the rectifier bridge 36. The fourth terminal 48 is connected by line 23 to the second end of fuse 32. The first terminal 42 is coupled to the first connection node 50 by line 54.

The storage capacitor circuit 18 includes the first and second storage capacitors 38 and 40 mentioned above. The first storage capacitor 38 has a first end 38a coupled to the first connection node 50 and a second end 38b coupled to the second connection node 52. It is to be noted that the first and second storage capacitors 38 and 40 can be selected so that the capacitor protection circuit 30 will cause the fuse 32 to blow when the voltage across the first and second capacitors 38 and 40 exceeds a predetermined voltage. In a preferred embodiment, the second storage capacitor 40 has first and second ends 40a and 40b, respectively. The second storage capacitor 40 is connected in parallel across the first storage capacitor 38, as shown in FIG. 2. In a preferred embodiment, each of the first and second storage capacitors 38 and 40 has a storage capacity of at least 2000 microfarads, and each also has a maximum voltage rating of 200 volts. The storage capacitor circuit 18 also includes a voltage divider 66 comprised of first and second resistors 68 and 70, respectively. A first end 68a of the first resistor 68 is connected to the first connection node 50, and a second end 68b of the first resistor 68 is connected to a first end 70a of the second resistor 70. A second end 70b of resistor 70 is connected to the second connection node 52. The function of voltage divider 66 is to bleed the voltage stored in the first and second capacitors 38 and 40 when the storage capacitor circuit 18 is not used. A third capacitor 72 having first and second ends 72a and 72b, respectively, is connected in parallel across the second resistor 70, as shown in FIG. 2. The function of the third capacitor 72 will be described later herein.

In a preferred embodiment, the storage capacitor circuit 18 includes a capacitor protection circuit 30. As mentioned earlier herein, the function of the capacitor protection circuit 30 is to cause an excessive amount of current to flow through the fuse 32 when the first or second storage capacitors 38 or 40 becomes overloaded, thereby causing the fuse 32 to "blow" and uncoupling the rectifier 16 from the EMI filter 14 and the AC input 12. The operation of the capacitor protection circuit 30 will be described later herein.

The capacitor protection circuit 30 includes first and second thyristors 74 and 76, respectively. In a preferred embodiment, the first thyristor 74 is a silicon controlled rectifier having an anode 74a, a cathode 74b, and a trigger 74c, and the second thyristor 76 is a bidirectional diode thyristor having an anode 76a and a cathode 76b. A suitable first thyristor 74 is the model 2N6507 SCR, manufactured by Motorola Corporation of Roselle, Illinois. A suitable second thyristor 76 is the model 1N5761A DIAC which is also manufactured by Motorola Corporation. The anode 76a of the second thyristor 76 is coupled by line 78 to the first end 72a of the capacitor 72, and the cathode 76b is coupled by line 80 to a first end 82a of a resistor 82. Notice that the second end 82b of resistor 82 is coupled to the second connection node 52 and is also coupled by line 86 to the cathode 74b of the first thyristor 74. The trigger 74c of the first thyristor 74 is connected by line 84 to the cathode 76b of the second thyristor 76 and to the first end 82a of resistor 82, as shown in FIG. 2. The function of resistor 82 is to provide a first reference voltage to be used by the second thyristor 76. As discussed later herein, a second reference voltage is the voltage drop across resistor 70. A low impedance thermistor 88 has a first end 88a which is coupled by line 90 to the first connection node 50. A second end 88b of thermistor 88 is coupled by line 92 to the anode 74a of the first thyristor 74. A suitable thermistor is the 2.5 ohm model 3D7116 thermistor, manufactured by Midwest Components, Inc. of Muskegon, Michigan. The function of the thermistor 88 will be described later herein. The storage capacitor circuit 18 is coupled by line 94 to the switches 20 which are also shown in FIG. 1.

The operation of the storage capacitor circuit 18 and the capacitor protection circuit 30 will now be described. As mentioned previously herein, the function of the storage capacitor circuit 18 is to receive the DC voltage from rectifier 16 and to store the high DC voltage. The function of the capacitor protection circuit 30 is to protect the storage capacitors 38 or 40 by causing an excessive amount of current to flow through the fuse 32 if the first or second storage capacitors 38 or 40 become overloaded, thereby causing the fuse to "blow" and uncoupling the rectifier 16 from the EMI filter 14 and the AC input 12. The rectifier bridge 36 rectifies the AC signal which is received on line 23 from EMI filter 14. The resulting positive voltage on line 54 charges the first and second capacitors 38 and 40. The voltage drop which charges capacitors 38 and 40 creates a voltage across the resistor 70 of voltage divider 66 which is less than the voltage across the first capacitor 38. Notice that the voltage across the second resistor 70 also charges capacitor 72. For example, if the voltage across the first storage capacitor 38 is increased until the maximum voltage rating for the first storage capacitor 38 is exceeded, then the voltage drop across resistor 70 of voltage divider 66 will cause the second thyristor 76 to be biased on. When the second thyristor 76 is biased on, the voltage on line 84 and at trigger 74c are the same as on line 78. The voltage at trigger 74c will cause the first thyristor 74 to be biased on which causes a low impedance path between the first and second connection nodes 50 and 52. This short circuit causes an excessive amount of current to flow through fuse 32 and through diode 56, thereby causing fuse 32 to blow, which in turn, disconnects the storage capacitor circuit 18 from the EMI filter 14 and the AC input 12. Notice that the function of capacitor 72 is to provide additional current which will to turn the first thyristor 74 on "hard". The harder the first thyristor 74 is turned on, the lower the "on" voltage required between the the anode 74a and the cathode 74b of the first thyristor 74. The thermistor 88 is required to limit the amount of current through the first thyristor 74 when it is biased "on" to protect the first thyristor 74 from excessive current. Notice that when the fuse 32 is blown, the first and second storage capacitors 38 and 40 and the other components in the power supply 10 are protected from damage which might occur if they continued to be energized. It is to be noted that even after the fuse 32 is blown, the thermistor 88 and the first thyristor 74 will continue to bleed any energy left in capacitors 38 and 40.

Figure 3A:
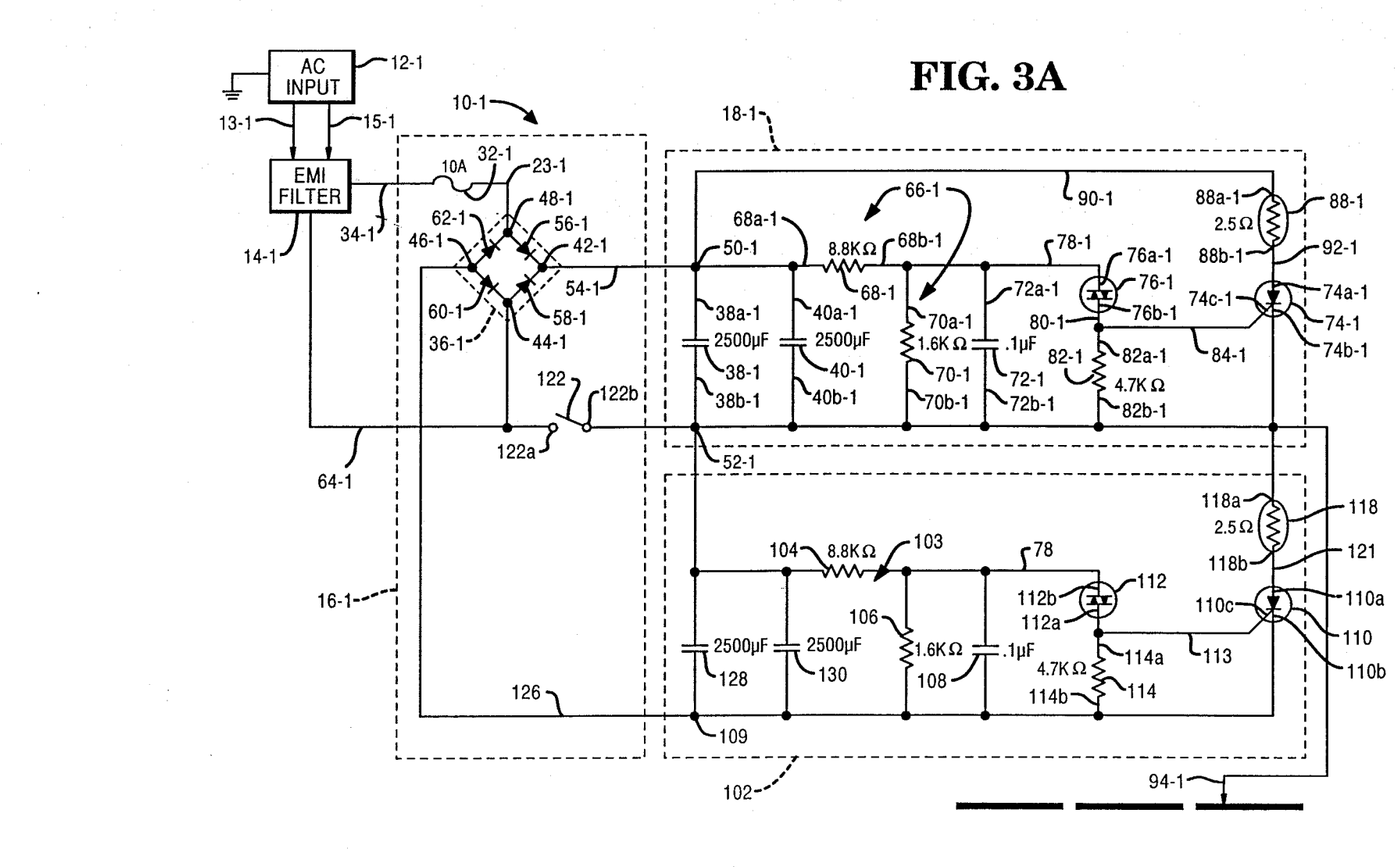
FIGS. 3A and 3B, taken together, show a schematic diagram of another embodiment of this invention, showing a switch mode power supply which is capable of operating from 110 and 220 AC voltage input sources.
Figure 3B:
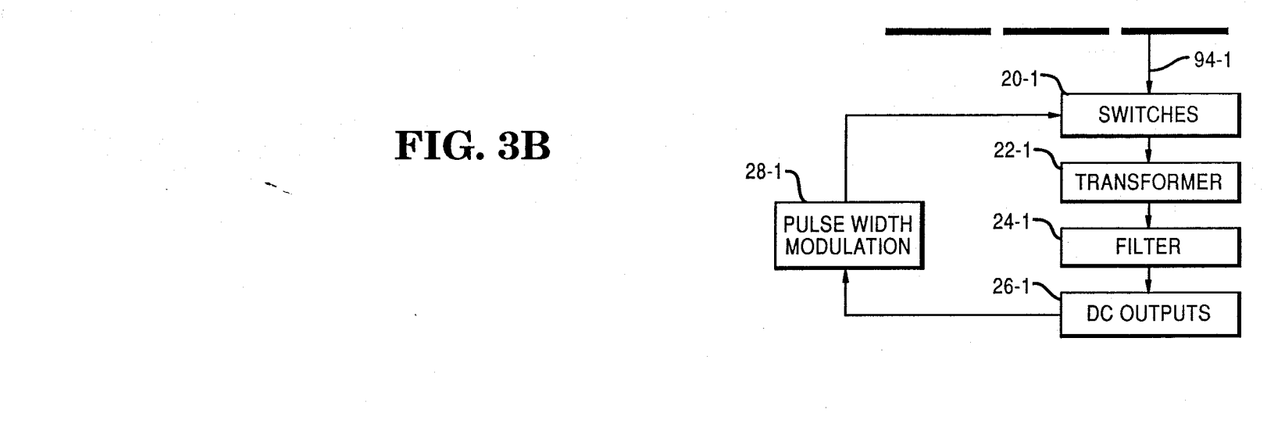

FIGS. 3A and 3B taken together show a switch mode power supply 10-1 which includes another embodiment of this invention. In order to avoid unnecessary descriptions, those elements in FIGS. 3A and 3B which are identical to corresponding elements in FIG. 2 are given a "dash one" (-1) designation. For example, the first thyristor 74-1 in FIG. 3A corresponds to the first thyristor 74 in FIG. 2. The switch mode power supply 10-1 can operate from either a 110 or 220 AC voltage input source of potential 12-1. A feature of this embodiment is that it protects a plurality of storage capacitors in the switch mode power supply 10-1. The switches 20-1, transformer 22-1, filter 24-1, DC outputs 26-1, pulse width modulator 28-1, fuse 32-1, rectifier bridge 36-1, and storage capacitor circuit 18-1 are connected and operate in the same manner as in the power supply 10 of FIG. 2.

The switch mode power supply 10-1 also includes a second storage capacitor circuit 102 (included in the dashed rectangle 102 in FIG. 3A) which includes fourth and fifth storage capacitors 128 and 130 and a voltage divider 103 which includes fourth and fifth resistors 104 and 106, respectively. The second storage capacitor circuit 102 also includes a sixth resistor 114; the third and fourth thyristors 110 and 112; a sixth capacitor 108; and a second thermistor 118 which are connected and operate in substantially the same manner as their corresponding elements in the storage capacitor circuit 18 shown in FIG. 2. The second storage capacitor circuit 102 also includes a third connection node 109. As shown in FIG. 3A, fourth and fifth storage capacitors 128 and 130 are connected in parallel between the second and third connection nodes 52 and 109. Like the first and second storage capacitors 38 and 40, the fourth and fifth storage capacitors 128 and 130 in this embodiment also have a maximum voltage rating of 200 volts.

The third and fourth thyristors 110 and 112 operate in a similar manner as the first and second thyristors 74 and 76, respectively, as described above in relation to FIG. 2. The third thyristor 110 has an anode 110a, a cathode 110b, and a trigger 110c and the second thermistor 118 has a first end 118a connected to the second connection node 52-1 and a second end 18b connected by line 121 to the anode 110a of the third thyristor 110. The trigger 110c is connected by line 113 to a cathode 112b of fourth thyristor 112 and to a first end 114a of resistor 114. A second end 14b of the resistor 114 is connected to the third connection node 109 and to the cathode 110b of the third thyristor 110. The operation of the second storage capacitor circuit 102 will be described later herein.

As shown in FIG. 3A, the switch mode power supply 10-1 also includes the rectifier 16-1 which includes the fuse 32-1, rectifier bridge 36-1 and common terminals 42-1, 44-1, 46-1, 48-1. The diodes 56-1, 58-1, 60-1, and 62-1 are connected in the same manner as in the rectifier bridge 36 in FIG. 2. The rectifier 16-1 also includes a single pole single throw switch 122 which has open and closed position for permitting the switch mode power supply 10-1 to operate from the AC input 12-1, which may provide either a 220 or 110 AC input, as will be explained subsequently herein. The switch 122 has first and second contacts 122a and 122b, respectively. The first and second contacts 122a and 122b are connected to the third terminal 44-1 and second connection node 52-1, respectively, as shown in FIG. 3A. The first contact 122a of switch 122 is also connected by line 64-1 to the AC neutral which is filtered through filter 14-1. The third connection node 109 of the circuit 102 is connected by conductor 126 to the fourth terminal 46-1.

Two examples of the operation of the switch mode power supply 10-1 and the second capacitor protection circuit 102 will now be described. If it is desired that the switch mode power supply 10-1 receive 220 volts from the AC input 12-1, then switch 122 would be moved to the open position. Assuming that the first capacitor 38-1 were overloaded with an excessive voltage which causes a short circuit between terminals 50-1 and 52-1, then the short circuit would cause the voltage on the first capacitor 38-1 to be transferred to the fourth and fifth storage capacitors 128 and 130. This transfer of voltage across the capacitors 128 and 130 would cause them to have voltage across their terminals in excess of their 200 volt maximum voltage rating. The increased voltage drop across the fifth resistor 106 causes the third and fourth thyristors 110 and 112 to be biased "on" in the same manner as the first and second thyristors 74 and 76, as described above in relation to FIG. 2. A low impedance path is generated which causes current to flow as follows. On the positive portion of the sine wave of the AC input signal which is inputted to the rectifier 16-1 from the EMI filter 14-1, current would flow through fuse 32-1, through diode 56-1, through the short between the first and second connection nodes 50-1 and 52-1, over to and through second thermistor 118, through the third thyristor 110 to the third connection node 109, over to and through the second terminal 46-1, through diode 60-1, and then out to AC neutral of AC input 12-1. This causes an excessive current to be drawn through the fuse 32-1, thereby blowing the fuse 32-1 and disconnecting the second rectifier 16-1 from the EMI filter 14-1.

The second example of the operation of the switch mode power supply 10-1 is as follows. If it is desired that the switch mode power supply 10-1 receive 110 volts from the AC input 12-1, then switch 122 would be actuated to the closed position. If, for example, 220 volts was then inadvertently applied from the AC input 12-1, an excessive voltage would appear on the first and second capacitors 38-1 and 40-1 during the positive portion of the AC sine wave input signal and on fourth and fifth capacitors 128 and 130 during the negative portion of the AC sine wave. The increased voltage on the capacitors 38-1 and 40-1 or capacitors 128 and 130, depending on which AC cycle energized the power supply 10-1 first, would cause the first thyristor 74-1 to conduct, as described previously regarding the first thyristor 74 in relation to FIG. 2. If the excessive voltage occurred across the first and second capacitors 38-1 and 40-1, the second thyristor 76-1 would bias on and trigger the first thyristor 74-1 which in turn would cause a low impedance path between the first and second connection nodes 50-1 and 52-1. This low impedance path would cause current to flow as follows. On the positive portion of the AC sine wave input signal, current would flow through fuse 32-1, through diode 56-1, over to and through the first thermistor 88-1, through the first thyristor 74-1, over to and through the second connection node 52-1, and back to switch 122 and out on line 64-1 to the filter 14-1. This causes an excessive amount of current to be drawn through the fuse 32-1, thereby blowing the fuse 32-1 and disconnecting the second rectifier 16-1 from the EMI filter 14-1 and the AC input 12-1.

Typical capacitance and resistance values for the capacitors and resistors, respectively, in the embodiment described previously are shown in FIGS. 2 and 3A.

Various changes or modifications in the invention described may occur to those skilled in the art without departing from the spirit or scope of the invention. The above description of the invention is intended to be illustrative and not limiting, and it is not intended that the invention be restricted thereto but that it be limited only by the true spirit and scope of the appended claims.

What is claimed is:

1. A capacitor protection circuit for protecting a capacitor in an electronic circuit, said electronic circuit comprising:
    a fuse having a first end connected to an AC input; and
    at least one diode connecting a second end of said fuse to a first end of said capacitor with a second end of said capacitor being connected to ground;
    said capacitor protector circuit comprising:
    a voltage divider connected across said capacitor;
    first thyristor means also connected across said capacitor; and
    second thyristor means coupling said voltage divider and said first thyristor means;
    said second thyristor means triggering said first thyristor means to conduct, causing an excessive amount of current to flow through said fuse to uncouple said electronic circuit from said AC input when the voltage across said capacitor exceeds a predetermined voltage.

2. The capacitor protection circuit as recited in claim 1 in which said voltage divider is comprised of at least two resistors.

3. The capacitor protection circuit as recited in claim 1 in which said first thyristor means includes a silicon controlled rectifier.

4. The capacitor protection circuit as recited in claim 3 in which said first thyristor means includes a thermistor connected between said silicon controlled rectifier and said first end of said capacitor.

5. The capacitor protection circuit as recited in claim 1 in which said second thyristor means includes a bidirectional diode thyristor.

6. The capacitor protection circuit as recited in claim 5 in which said second thyristor means further includes a resistor connected between said bidirectional diode thyristor and ground.

7. The capacitor protection circuit as recited in claim 6 in which said second thyristor means includes a capacitor which is connected in parallel across said resistor.

8. A circuit comprising:
    a fuse having first and second ends, with said first end connected to an AC input;
    a first capacitor having first and second ends, said first capacitor also having a maximum voltage rating, said second end of said first capacitor being connected to ground;
    rectifier means connecting said second end of said fuse to said first end of said first capacitor for rectifying said AC voltage;
    a voltage divider means connected across said first capacitor;
    first thyristor means connected in parallel across said first capacitor; and
    second thyristor means operatively coupling said voltage divider means and said first thyristor means;
    said second thyristor means triggering said first thyristor means to conduct, causing an excessive amount of current to flow through said fuse to blow said fuse and uncouple said circuit from said AC input when the voltage across said first capacitor exceeds a predetermined voltage which is less than said maximum voltage rating.

9. The circuit as recited in claim 8 in which said second thyristor means includes a bidirectional diode thyristor.

10. The circuit as recited in claim 9 in which said bidirectional diode thyristor has an anode and cathode, said second thyristor means further including a resistor which is coupled between the cathode of said bidirectional diode thyristor and ground, said anode being coupled to said voltage divider means.

11. The circuit as recited in claim 10 in which said second thyristor means further includes a capacitor having one end coupled to the anode of the bidirectional diode thyristor and the remaining end coupled to ground.

12. The circuit as recited in claim 11 in which said first thyristor means further comprises a silicon controlled rectifier having an anode, a cathode, and a trigger and also having a thermistor, said thermistor being coupled to said anode of said silicon controlled rectifier and said first end of said first capacitor, said trigger and said cathode of said silicon controlled rectifier being connected to said cathode of said second thyristor and to ground, respectively.

13. The circuit as recited in claim 8 in which said first capacitor has a capacity of at least 2000 microfarads.

14. A circuit comprising:
   a fuse having first and second ends, said first end being connected to an AC input;
   a first capacitor having first and second ends, said first capacitor having a maximum voltage rating;
   a first diode connecting said second end of said fuse to said first end of said first capacitor, said second end of said first capacitor being connected to ground;
   at least one first resistor and at least one second resistor, said first and second resistor being connected in series across said first capacitor for providing a voltage divider;
   a second capacitor having first and second ends, said second capacitor being connected in parallel across said second resistor;
   a third resistor having first and second ends, said first end being connected to ground;
   a first thyristor having an anode, a cathode, and a trigger;
   a thermistor connected between said first end of said first capacitor and said anode of said first thyristor; and
   a second thyristor having an anode and a cathode, said anode of said second thyristor being connected to said first end of said second capacitor, and said cathode of said second thyristor being connected to said second end of said third resistor;
   said first thyristor having its cathode connected to ground and its trigger connected to said cathode of said second thyristor;
   said second thyristor triggering said first thyristor and causing an excessive amount of current to flow through said fuse when the voltage across said first capacitor exceeds a predetermined voltage which is less than said maximum voltage rating.

15. The circuit as recited in claim 14 in which said first thyristor is a silicon controlled rectifier.

16. The circuit as recited in claim 14 in which said second thyristor is a bidirectional diode thyristor.

17. The circuit as recited in claim 14 in which said first capacitor has a capacity of at least 2000 microfarads.

18. A circuit comprising:
   a rectifier bridge having opposed first and second terminals and also having opposed third and fourth terminals;
   a fuse being series connected between said first terminal and a line of AC potential and said second terminal being connected to neutral of said AC potential;
   said circuit also having first, second, and third connection nodes;
   said third and fourth terminals being connected to said first and third connection nodes, respectively;
   a switch series connected between said second terminal and said second connection node, said switch causing said circuit to operate in a 110 or 220 voltage input mode depending on whether the switch is in a closed or open position, respectively;
   at least one first capacitor being connected in parallel across said first and second connection nodes;
   at least one second capacitor being connected in parallel across said second and third connection nodes;
   said first and second capacitors having first and second maximum voltages, respectively;
   at least one first resistor and at least one second resistor, said first and second resistors being connected in series between said first and second connection nodes in order to provide a first voltage divider;
   at least one third resistor and at least one fourth resistor, said third and fourth resistors being connected in series between said second and third connection nodes in order to provide a second voltage divider;
   a third and fourth capacitor each having first and second ends, said first and second ends of said third capacitor being connected in parallel across said first and second connection nodes, respectively, said first and second ends of said fourth capacitor being connected in parallel across said second and third connection nodes, respectively,
   a first thyristor having an anode, a cathode, and a trigger;
   a fifth resistor having first and second ends; said first end of said fifth resistor being connected to said second connection node;
   a first thermistor having first and second ends, said first end being connected to said first connection node and said second end thereof being connected to said anode of said first thyristor;
   a second thyristor having an anode and a cathode, said anode of said second thyristor being connected to said first end of said third capacitor; said cathode of said second thyristor being connected to said second end of said fifth resistor;
   said cathode of said first thyristor being connected to said second connection node, said trigger of said first thyristor being connected to said cathode of said second thyristor;
   a third thyristor having an anode, a cathode, and a trigger;
   a sixth resistor having first and second ends; said first end of said sixth resistor being connected to said third connection node;
   a second thermistor having first and second ends, said first end of said second thermistor being connected to said second connection node and said second end thereof being connected to said anode of said third thyristor;
   a fourth thyristor having an anode and a cathode, said anode of said fourth thyristor being connected to said first end of said at least one fourth resistor and said cathode thereof being connected to said third connection node;

said cathode of said third thyristor being connected to said third connection node, said trigger of said third thyristor being connected to said cathode of said fourth thyristor;

said second thyristor triggering said first thyristor and causing an excessive amount of current to flow through said fuse to blow said fuse when the voltage across said first capacitor exceeds a predetermined voltage which is less than said first maximum voltage;

said fourth thyristor triggering said third thyristor and causing an excessive amount of current to flow through said fuse to blow said fuse when the voltage across said second capacitor exceeds a predetermined voltage which is less than said second maximum voltage.

19. The circuit as recited in claim 18 in which said first and third thyristors are silicon controlled rectifiers.

20. The circuit as recited in claim 18 in which said second and fourth thyristors are bidirectional diode thyristors.

21. The circuit as recited in claim 18 in which circuit further comprises:

fifth and sixth capacitors each having first and second ends, said first and second ends of said fifth capacitor being connected in parallel across said at least one second resistor, said first and second ends of said sixth capacitor being connected in parallel across said at least one fourth resistor.

* * * * *